United States Patent

Wagner

[15] 3,688,872
[45] Sept. 5, 1972

[54] COMBINED BEARING LUBRICATION-HYDROGEN SEAL SYSTEM FOR GENERATOR

[72] Inventor: James B. Wagner, Lynn, Mass.

[73] Assignee: General Electric Company

[22] Filed: Feb. 11, 1971

[21] Appl. No.: 114,546

[52] U.S. Cl.................184/6.28, 184/104 R, 277/15, 308/36.3
[51] Int. Cl..............................................F16n 7/36
[58] Field of Search......277/3, 15; 184/6 R, 31, 6.28, 184/104; 308/36.1, 36.3

[56] References Cited

UNITED STATES PATENTS

| 2,636,754 | 4/1953 | Baudry | 277/15 |
| 3,396,664 | 8/1968 | Smith | 184/6 X |
| 3,390,525 | 7/1968 | Spillmann | 308/36.3 X |
| 3,324,970 | 6/1967 | McHugh | 184/31 X |

Primary Examiner—Manuel A. Antonakas
Attorney—William C. Crutcher, James W. Mitchell, Oscar B. Waddell, Joseph B. Forman and Frank L. Neuhauser

[57] ABSTRACT

A combined bearing lubrication-hydrogen seal system for a generator which utilizes a unitized lubrication system in cooperation with a hydrogen-cooled generator. A liquid lubricant, under pressure, is pumped to the hydrogen seal about the generator shaft to prevent hydrogen leakage. As the lubricant passes through the seal portion, it may be distributed into an end shield which houses a unitized lubrication system for cooling the generator shaft end bearing. Thereafter, the liquid lubricant is fed to a receiver tank where it is recirculated to the hydrogen seal.

5 Claims, 3 Drawing Figures

PATENTED SEP 5 1972
3,688,872
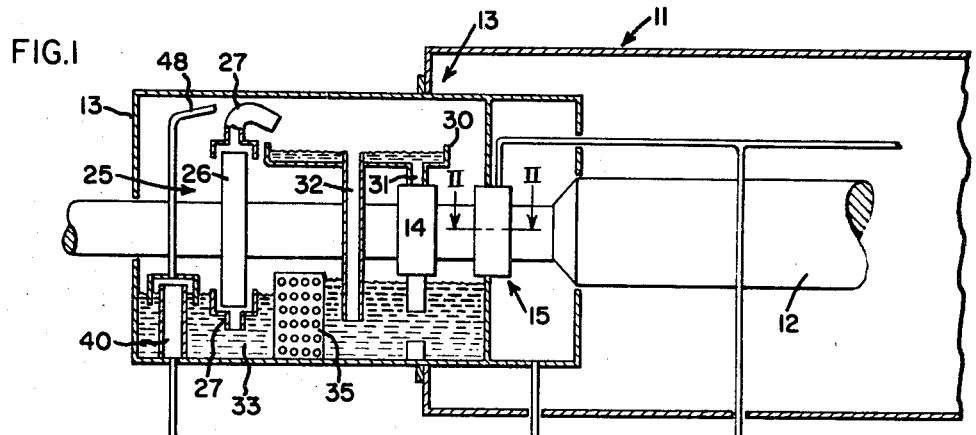
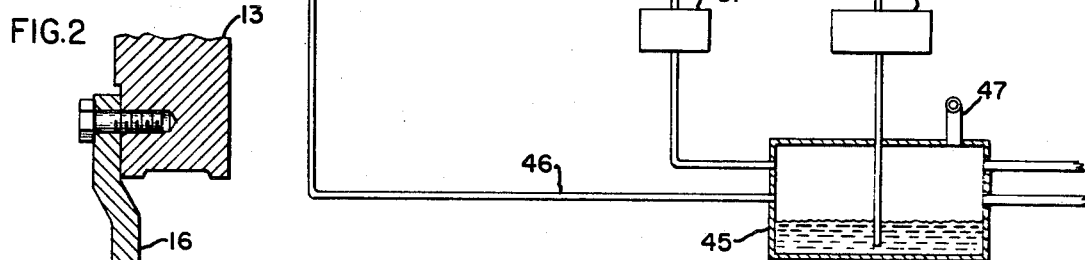
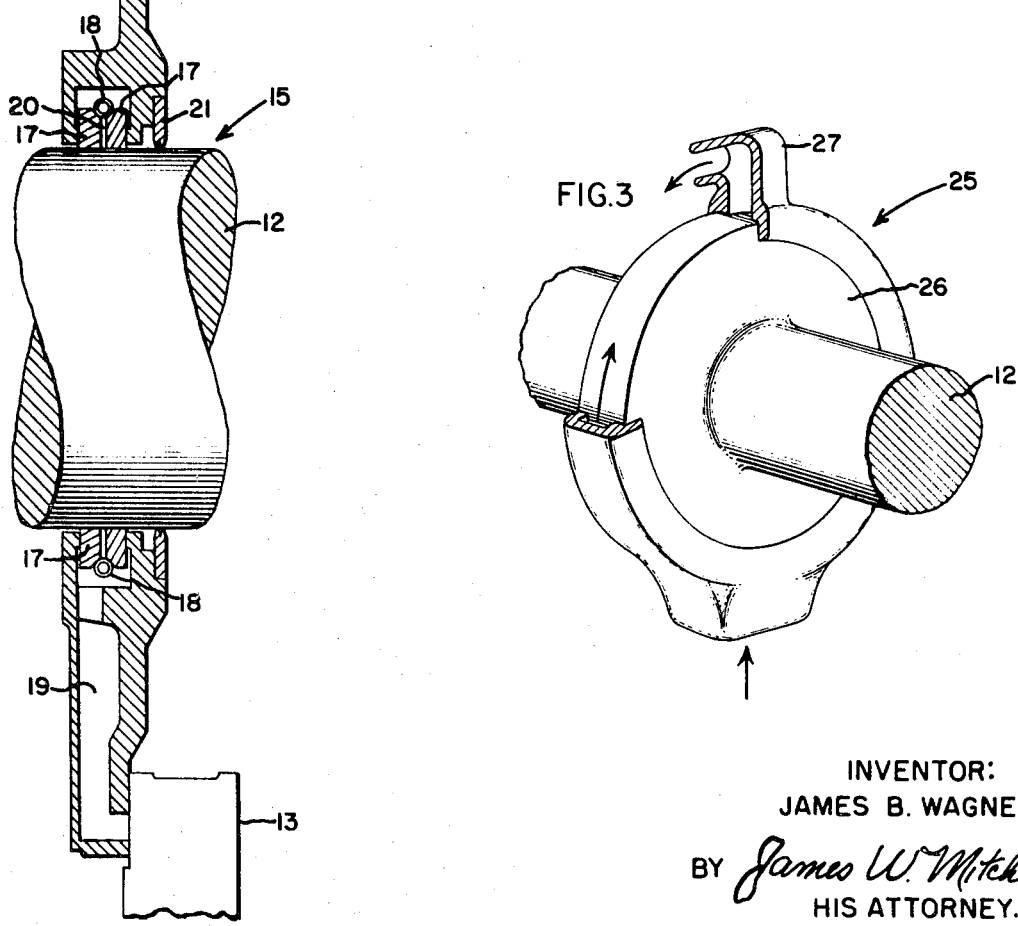
INVENTOR:
JAMES B. WAGNER,
BY *James W. Mitchell*
HIS ATTORNEY.

COMBINED BEARING LUBRICATION-HYDROGEN SEAL SYSTEM FOR GENERATOR

BACKGROUND OF THE INVENTION

The historic growth in the ratings of turbine-generator units has been a very powerful complicating factor in the evolution of turbine lubrication and control fluid systems. Potentially, the most serious hazards and the most frequently occurring problems associated with basically sound lubrication systems are: (1) fire and (2) bearing failures resulting from an interrupted supply of lubricant. Both invariably result in forced power generation outages.

The first problem has been minimized by the introduction of fire-resistant lubricants, such as a phosphate ester fluid having an auto-ignition temperature which far exceeds that of ordinary commonly used turbine oils. Thus, greater protection is afforded against the hazard of fire.

The second problem, which is the subject of this invention, although not divorced completely from the fire hazard problem, is the problem of interruption of the bearing fluid supply. These interruptions are due primarily to the fact that all modern lubrication systems must rely on external energy sources not only during emergency conditions but also during completely normal starting and stopping cycles. The inadvertent temporary loss of these energy sources is the prime cause of lubrication system failure. The fluid supply problem would be resolved if a reliable integral pump could be devised which would always deliver the proper temperature fluid at the required flow rate. Such a pump has become the subject matter of U.S. pending patent application, Ser. No. 29,125 filed Apr. 16, 1970 now U.S. Pat. No. 3,635,578 for a Viscous Pump for a Unitized Bearing Lubrication System, and assigned to the present assignee. The pump described in this application is a viscous pump which is integral with the generator shaft to provide recirculation of liquid lubricant about the generator shaft bearing whenever the generator shaft is rotating.

In a hydrogen-cooled generator, a seal assembly is provided about the generator shaft between the pressurized portion of the generator housing and the unpressurized portion of the generator housing. A pressurized fluid lubricant annulus is provided as part of the hydrogen seal assembly in a manner hereinafter described. Fluid lubricant then drains from the hydrogen seal assembly and is used to lubricate other generator parts. This mode of lubrication provides the basis of a unitized lubrication system which combined with a hydrogen-cooled generator forms and subject of this application.

OBJECTS OF THE INVENTION

Accordingly, it is an object of this invention to provide a unitized bearing lubrication system which will provide lubrication to the generator bearings whenever the rotor shaft is turning.

It is an object of this invention to provide a bearing lubrication system which is not dependent upon an outside source of energy for providing recirculation of the bearing lubrication fluid.

It is still a further object of this invention to combine this unitized bearing lubrication system with a hydrogen-cooled generator.

Other objects, advantages and features of the present invention will become apparent from the following description of a preferred embodiment thereof when taken in connection with the accompanying drawings.

DRAWING

FIG. 1 is a diagrammatic representation of a unitized bearing lubrication system as applied to a hydrogen cooled generator.

FIG. 2 is a cross section elevation view taken at section II—II of FIG. 1 showing a typical seal portion of a hydrogen cooled generator.

FIG. 3 is a perspective view showing the viscous pump of the unitized bearing lubrication system.

SUMMARY OF THE INVENTION

A hydrogen cooled generator is supplied with a fluid lubricant under pressure by a pump system connected to a receiver tank. The fluid lubricant is pumped into the hydrogen seal so that it pressurizes an annulus formed between the hydrogen seal and the generator shaft. Thereafter, part of the fluid lubricant flows into a reservoir where it is circulated around the generator shaft bearing by the unitized bearing lubrication system. The fluid then flows by gravity to the receiver tank where the fluid is then recycled.

DETAILED DESCRIPTION OF THE DRAWING

Referring to FIG. 1, a generator casing is shown generally at 11, partially enclosing a rotatable generator shaft 12. Extending axially from the generator casing is an end shield 13. It should be clear that only half of the actual generator has been shown because of drawing space consideration, and that the opposite ends of the generator casing may be similar to the one shown.

The generator shaft is rotatably mounted upon end bearing 14 supported by the generator casing. The hydrogen seal assembly 15 is mounted within the end shield. Details of the construction of this seal will be shown later.

The unitized bearing lubrication system includes a viscous pump 25 coaxially mounted on the generator shaft. The viscous pump comprises a disk 26 formed integral with and therefore rotatable with the generator shaft; and also a pump casing 27 which is physically supported and guided by the rotatable disk as explained in U.S. Pat. application, Ser. No. 25,125 filed Apr. 16, 1970 for a Viscous Pump for a Unitized Bearing Lubrication System. Fig. 3 generally shows the construction of this pump. As the generator shaft rotates, the viscous pump, which is partially submerged in a fluid reservoir 33 formed as part of the end shield, pumps fluid to a level where it may flow, under the influence of gravity, into the end bearing, thereby cooling the generator shaft end bearing.

A distribution tray 30 is mounted above the generator shaft end bearing 14, so that it may collect fluid lubricant from the viscous pump casing and channel the lubricant to the bearing for cooling the bearing. Excess fluid lubricant in the distribution tray is taken by an overflow weir 32 and deposited directly into the fluid reservoir.

A heat exchanger 35 may be mounted in the fluid reservoir in order to cool the liquid lubricant which has been distributed over the bearing. The heat exchanger creates a damming effect so that the pressure head on the side of the heat exchanger near the bearing is greater than the pressure head near the viscous pump, thereby aiding in the circulation of lubricant through the heater exchanger. Another embodiment, not shown, may position the heat exchanger in the distribution tray.

A second overflow weir 40 may be mounted in the fluid reservoir 33 and excess fluid will flow to a receiver tank 45 through conduit 46. An exhauster connection pipe 47 is located on the upper portion of the receiver tank 45 to remove free hydrogen which may be carried by the lubricant fluid. For the same purpose, an exhauster inlet pipe 48 is provided in the end shield. As shown in the drawings, the exhauster inlet pipe 48 extends, at its lower end, into the fluid reservoir 33. This construction allows a sealed connection between the exhauster inlet pipe 48 and the exhauster connection pipe 47 so that free hydrogen may be drawn from the end shield.

The typical hydrogen seal assembly 15 is shown in more detail in FIG. 2. In order to minimize the escape of hydrogen gas from the generator casing along the generator shaft, the hydrogen seal assembly 15 is provided. The hydrogen seal assembly consists of a housing 16, supported from the end shield, in which a pair of annular sealing rings 17, having an internal diameter a few mils larger than the shaft diameter, are provided. The rings may be of composition bronze material and are made generally in segments, the segments being held together radially by a pair of coil springs 18 attached to the seal housing. The springs also serve to separate the pair of rings axially. Fluid lubricant, at a pressure about 5 psig above the hydrogen pressure in the generator casing, is supplied to the seal housing through oil feed 19, and enters the annular space 20 between the sealing ring an flows in both directions along the shaft between the sealing ring and the shaft. An annular oil deflector 21 deflects oil away from the generator shaft. The seal is so constructed that the greater volume of fluid lubricant is directed to the end shield, while only a small amount of fluid lubricant is leaked back into the generator housing.

It is clear that pressurized lubricant fluid around the hydrogen seals may flow to the fluid reservoir or it may flow to the other side of the end shield where it passes through a trap drain system 51 via conduit 50 and then into the receiver tank 45. The trap drain system may contain a float valve (not shown) so that only fluid lubricant may flow to the receiver tank and wholesale escape of hydrogen from the generator casing is prevented. Fluid lubricant in the receiver tank has been thoroughly detrained of hydrogen. The circulation of the fluid lubricant back to the hydrogen seals is accomplished by a pump system 56 which may have one active pump and one standby pump through conduit 55.

MODE OF OPERATION

Liquid lubricant is drawn up from the receiver tank 45 by the pump system 56 and pumped under pressure to conduit 55 until it reaches the hydrogen seal assembly 15. As was previously mentioned, this liquid lubricant pressurizes the hydrogen seal to prevent the escape of hydrogen. The lubricant fluid then flows away from the hydrogen seal assembly either into the reservoir 33 located in the end shield or into the pressurized portion of the end shield and from there into the trap drain system. Fluid flowing into the trap drain system is returned to the receiver tank. Fluid flowing into the reservoir in the end shield is picked up by the viscous pump of the unitized bearing lubrication system and pumped into the distribution tray. From the distribution tray the liquid lubricant flows into the generator shaft end bearing, and then back into the end shield reservoir. Excess fluid may flow into the overflow weir in the distribution tray and be deposited directly into the reservoir. A heat exchanger 35 in the reservoir cools the liquid as it recirculates about the generator shaft bearing. The exhauster inlet pipe 48 prevents the accumulation of hydrogen gas in the end shield by its closed communication with the exhauster connection pipe 47. Excess fluid in the reservoir flows through an overflow weir 40 to a conduit 46 and then is returned to the receiver tank. Excess hydrogen accumulating in the receiver tank is evacuated through the exhauster connection pipe 47. The liquid lubricant flowing through conduits 46 and 50 and deposited into the receiver tank is then again recirculated by pump system 56.

Thus it becomes apparent that bearing failures due to insufficient bearing lubrication in a hydrogen cooled generator are omitted. As long as the generator shaft is turning, the unitized bearing lubrication system will deliver lubricant to the generator shaft bearing. Since the same fluid both serves to seal and lubricate the generator, savings in space and other economies are provided.

While there is shown what is considered at present to be the preferred embodiment of the invention, it is of course understood that various other modifications may be made therein, and it is intended to cover in the appended claims all such modifications as fall within the true spirit and scope of the invention.

What is claimed is:

1. In a generator, of the kind which is cooled by hydrogen gas, having a rotor shaft mounted within a generator casing, and an end shield extending outwardly from said generator casing; an end bearing supporting said generator shaft and a hydrogen seal assembly of the type requiring a pressurized fluid lubricant between said seal assembly and the rotor shaft; a combined bearing lubrication system including:

a receiver tank containing a supply of fluid lubricant and a conduit including a pump delivering said fluid lubricant under pressure to said hydrogen seal assembly;

a reservoir in said end shield assembly adjacent said hydrogen seal assembly into which a portion of the fluid lubricant drains, a viscous pump, partially submerged in said reservoir, coaxially mounted on said rotor shaft for distributing fluid lubricant about said end bearing; and, an overflow weir in said reservoir recirculating excess fluid lubricant to said receiver tank.

2. The combined bearing lubrication system as recited in claim 1 wherein there is a heat exchanger mounted in said reservoir between said viscous pump and said end bearing.

3. The combined bearing lubrication system as recited in claim 2 wherein there is a distribution tray adjacent said viscous pump for distributing fluid lubricant to said end bearing and an overflow weir in said distribution tray for returning excess fluid to said reservoir.

4. The combined system as recited in claim 3 wherein there is an exhaust inlet pipe above the reservoir overflow weir in closed communication with an exhauster connection pipe in said receiver tank, whereby free hydrogen accumulating in said end shield assembly may be evacuated through said exhauster connection pipe.

5. The combination as recited in claim 4 wherein fluid lubricant leaking into the generator casing may be removed from said casing through a trap drain system to the receiver tank while hydrogen is retained in the generator casing.

* * * * *